(12) United States Patent  
Joseph et al.

(10) Patent No.: US 9,278,716 B1
(45) Date of Patent: Mar. 8, 2016

(54) FENDER FOR A VEHICLE INCLUDING A BODY PORTION AND A FLEXIBLE SEAL PORTION

(71) Applicant: Ford Global Technologies, LLC, Dearborn, MI (US)

(72) Inventors: Thomas Joseph, Canton, MI (US); Bruno M. Barthelemy, Ann Arbor, MI (US); Edward Andrew Pleet, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/469,844

(22) Filed: Aug. 27, 2014

(51) Int. Cl.
*B62D 25/18* (2006.01)
*B62D 25/16* (2006.01)

(52) U.S. Cl.
CPC .............. *B62D 25/165* (2013.01); *B62D 25/18* (2013.01)

(58) Field of Classification Search
CPC ....... B62D 25/12; B62D 25/165; B62D 25/18
USPC ............................................ 296/198, 193.11
See application file for complete search history.

(56) References Cited

U.S. PATENT DOCUMENTS

| | | | | |
|---|---|---|---|---|
| 2,616,724 | A | * | 11/1952 | Barr ........................... 280/153.5 |
| 6,383,654 | B1 | | 5/2002 | Yabe et al. |
| 7,316,447 | B2 | | 1/2008 | Kelly |
| 7,494,179 | B2 | | 2/2009 | Deachin et al. |
| 7,632,445 | B2 | | 12/2009 | Porter et al. |
| 7,661,953 | B2 | * | 2/2010 | Sekito et al. ................... 425/577 |
| 8,109,560 | B2 | | 2/2012 | Joly-Pottuz |
| 8,870,271 | B2 | * | 10/2014 | Ellison et al. ................... 296/192 |
| 8,925,992 | B2 | * | 1/2015 | Schaefer ....................... 296/39.3 |
| 2006/0226681 | A1 | * | 10/2006 | Kelly ............................ 296/192 |
| 2008/0111394 | A1 | * | 5/2008 | Lewis ....................... 296/187.02 |
| 2009/0085374 | A1 | * | 4/2009 | Takei ....................... 296/187.09 |
| 2009/0309073 | A1 | | 12/2009 | Takagi et al. |
| 2010/0314518 | A1 | * | 12/2010 | Steinhilb et al. ............ 248/274.1 |
| 2013/0076076 | A1 | * | 3/2013 | Partsch et al. ............ 296/193.11 |
| 2013/0113236 | A1 | | 5/2013 | Oomen |

FOREIGN PATENT DOCUMENTS

| | | |
|---|---|---|
| CN | 101357509 A | 2/2009 |
| CN | 100540262 C | 9/2009 |
| DE | 102006029164 B3 | 1/2008 |
| JP | 2001-138825 A * | 5/2001 |

OTHER PUBLICATIONS

Zhao et al., "Over moulding technologies for automotive plastics components manufacturing applications", SIMTech technical reports, vol. 9, No. 3, Jul.-Sep. 2008, 6 pages.

* cited by examiner

*Primary Examiner* — Jason S Morrow
(74) *Attorney, Agent, or Firm* — Jason C. Rogers; Bejin Bieneman PLC

(57) ABSTRACT

A fender for a vehicle includes a body portion and a seal portion. The body portion presents an outer surface and an inner surface facing opposite the outer surface. The seal portion extends from the inner surface and is flexible relative to the body portion. The body portion is formed of a first material and the seal portion is formed of a second material different than the first material. The seal portion is integral with the body portion.

3 Claims, 4 Drawing Sheets

FENDER FOR A VEHICLE INCLUDING A BODY PORTION AND A FLEXIBLE SEAL PORTION

BACKGROUND

Fenders of a vehicle are mounted on a front portion of the vehicle on both the driver side and the passenger side. The fenders each present an outer surface that is designed with a shape and size that provides desired aerodynamics and a desired aesthetic appearance. The outer surface is a class-A surface, i.e., a surface specifically manufactured to have a high quality, finished aesthetic appearance free of blemishes. The class-A surface may be painted.

The fenders each present an inner surface opposite the outer surface. The inner surface is sealed to various components of the vehicle to minimize noise, vibration, and/or harshness (NVH). As one example, the vehicle includes a bodyside, which may be formed of sheet metal, to which exterior components such as the fender, doors, etc., are mounted. A foam pad is adhered to the inner surface of the fender and extends from the inner surface to the bodyside to minimize noise and water intrusion. The foam pad typically abuts the bodyside below an A-pillar of the vehicle and is resiliently trapped between the fender and the bodyside along a door line of the vehicle.

The foam pad will not withstand high temperatures associated with the paint process when painting the fender. As such, an additional manufacturing step is required to adhere the foam pad to the inner surface of the fender after the painting process. This additional assembly step is time consuming and, thus, increases the cost to manufacture the fender.

The foam pad provides an imprecise seal between the fender and the bodyside. The subsequent step of adhering the foam pad after the painting process may introduce inaccuracies in the placement of the foam pad relative to the fender. In addition, inaccuracies in the shape of the foam pad may arise from the manufacturing process of the foam pad. Each of these inaccuracies are typically accounted for by designing the foam pad to be oversized to ensure that the foam pad is resiliently pinched between the fender and the bodyside when the fender is assembled to the vehicle. However, the oversized design of the foam pad disadvantageously results in unnecessary material usage, weight, bulkiness, etc.

As another example of sealing between the fender and other components of the vehicle, a bulb seal may be supported by the inner surface to seal between the fender and a hood of the vehicle. Similar to the foam pad, the bulb seal will not withstand the high temperatures associated with the paint process when painting the fender. As such, an additional assembly step is required to attach the bulb seal to the fender after the painting process. This additional assembly step is time consuming and, thus, increases the cost to manufacture the fender.

An opportunity remains to design a fender that precisely seals to other components of the vehicle and reduces manufacturing and assembly complexity and inaccuracies.

DETAILED DESCRIPTION

Figure 1:
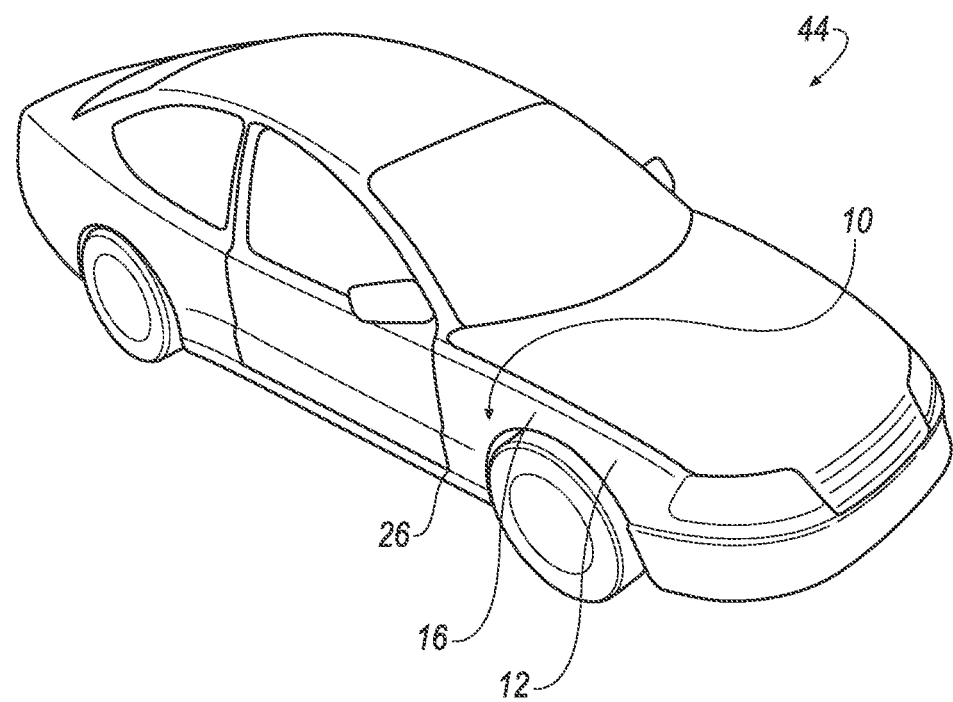
FIG. 1 is a perspective view of a vehicle including a fender and a hood.

With reference to the Figures, wherein like numerals indicate like parts throughout the several views, a fender 10 for a vehicle 44 includes a body portion 12 and a seal portion 14. The body portion 12 presents an outer surface 16 and an inner surface 18. The seal portion 14 extends from the inner surface 18 and is flexible relative to the body portion 12. The body portion 12 is formed of a first material and the seal portion 14 is formed of a second material different than the first material. The seal portion 14 is integral with the body portion 12, i.e., are both formed together as a one-piece unit in a single manufacturing process. For example, the seal portion 14 and the body portion 12 may be formed together as a one-piece unit by a multiple-shot injection molding process, as set forth further below.

The assembly of the fender 10 to the vehicle 44 during the assembly process of the vehicle 44 is simplified due to the seal portion 14 being integral with the body portion 12. For example, since the seal portion 14 is integral with the body portion 12, manufacturing of the fender 10 does not require an additional step of adhering the seal portion 14 to the body portion 12 after the painting process. Specifically, the body portion 12 and the seal portion 14 may both be exposed to the painting process of the fender 10, as set forth further below.

By eliminating the step of adhering the seal, the misplacement errors involved in that step are eliminated. In addition, the seal portion 14 may be precisely located relative to the body portion 12 to assure that the seal portion 14 is properly located to provide appropriate sealing when assembled to the vehicle 44, e.g., sealing to a bodyside 20 and/or a hood 22 of the vehicle 44, as set forth further below. Since the seal portion 14 may be precisely located, the size and shape of the seal portion 14 may be precisely formed to achieve the desired sealing while minimizing the amount of material used to form the seal portion 14.

An exterior assembly 24 may include the bodyside 20 and the fender 10. The fender 10 is adjacent the bodyside 20 and the inner surface 18 of the body portion 12 faces the bodyside 20. The exterior assembly 24 may include the hood 22, which is adjacent the fender 10. The seal portion 14 may extend from the body portion 12 to the bodyside 20 and/or the hood 22. For example, in the configuration shown in the Figure, the seal portion 14 extends from the body portion 12 to the bodyside 20 and abuts the bodyside 20. In such a configuration, the fender 10 may include a second seal portion 34, as set forth further below, extending from the body portion 12 to the hood 22 when the hood 22 is in a closed position.

Figure 2:
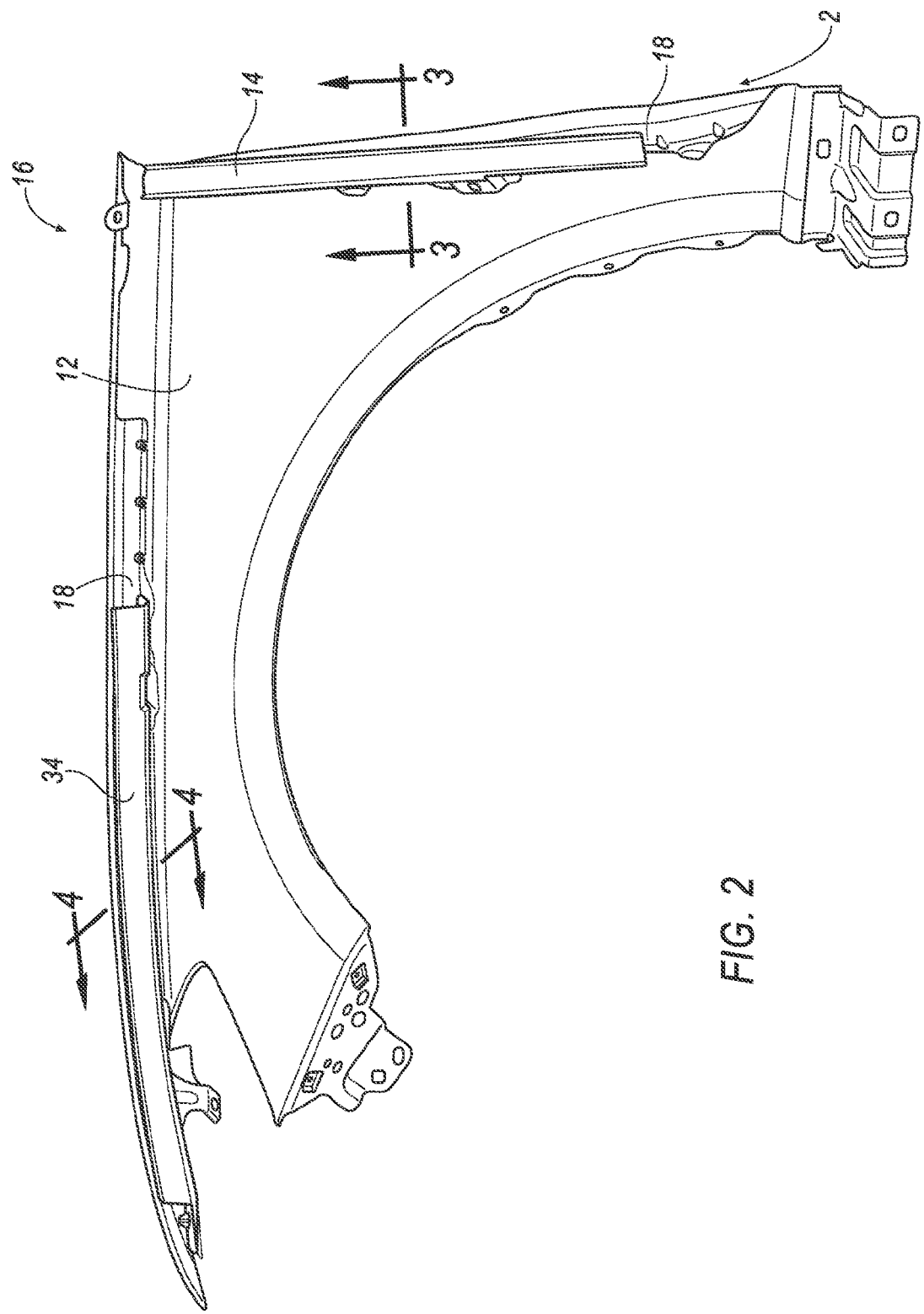
FIG. 2 is a perspective view of an inner surface of the fender.
Figure 3A:
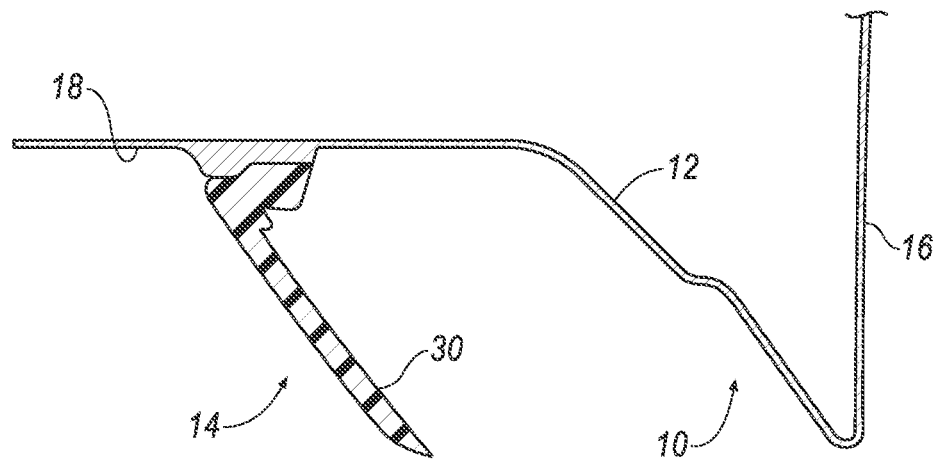
FIG. 3A is a cross-sectional view of a portion of the fender with a body portion and a seal portion integral with the body portion.
Figure 3B:
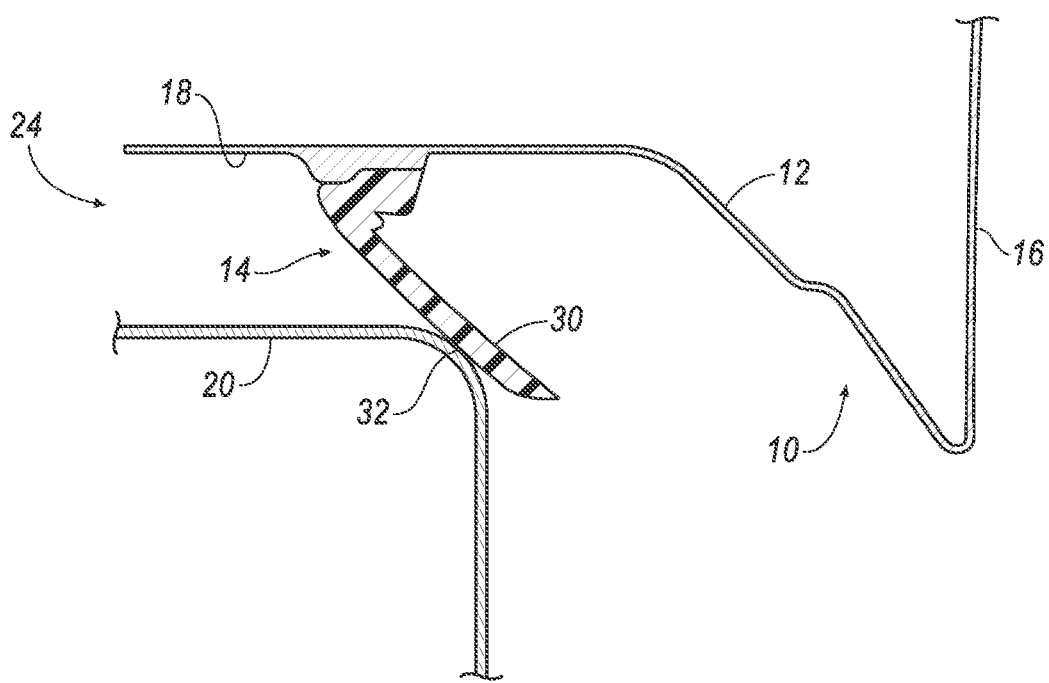
FIG. 3B is a cross-sectional view of a portion of the fender and a portion of a bodyside of the vehicle with the seal extending from the body portion of the fender to the bodyside.

With reference to FIG. 2, the seal portion 14 may extend along a door line 26 of the vehicle 44. With reference to FIGS. 2, 3A, and 3B, the seal portion 14 includes a base 28 integral with the body portion 12 and a lip 30 extending from the base 28. The lip 30 presents a sealing surface 32. The lip 30 is resiliently flexible relative to the base 28. As shown in FIGS.

3A and 3B, the lip 30 is configured to abut the bodyside 20 and resiliently flex against the bodyside 20 when the fender 10 is assembled to the bodyside 20. As such, the lip 30 remains biased against the bodyside 20 when the fender 10 is assembled to the bodyside 20.

The sealing surface 32 is spaced from the inner surface 18 of the body portion 12. The sealing surface 32 is configured to seal to the bodyside 20 of the vehicle 44. Specifically, the sealing surface 32 is sized and shaped to abut the bodyside 20 of the vehicle 44 for sealing to the bodyside 20 when the fender 10 is assembled to the vehicle 44.

The seal portion 14 permanently seals to the bodyside 20. In other words, once the fender 10 is assembled to the vehicle 44, the fender 10 and bodyside 20 remain stationary relative to each other while in normal use, i.e., absent an impact of the vehicle 44, absent removal for repair of the vehicle 44, etc., and the seal portion 14 remains in contact with the bodyside 20.

The second seal portion 34 may be spaced from the seal portion 14. The second seal portion 34 is integral with the body portion 12, i.e., are both formed together as a one-piece unit in a single manufacturing process. For example, the second seal portion 34 and the body portion 12 may be formed together as a one-piece unit by a multiple-shot injection molding process, as set forth further below. The seal portion 14, for example, may be formed with the body portion 12 and the second seal portion 34 in the same multiple-shot injection molding process, as set forth further below.

The assembly of the fender 10 to the vehicle 44 during the assembly process of the vehicle 44 is simplified because the second seal portion 34 is integral with the body portion 12. For example, since the second seal portion 34 is integral with the body portion 12, manufacturing of the fender 10 does not require an additional step of adhering the second seal portion 34 to the body portion 12 after the painting process. Specifically, the body portion 12 and the second seal portion 34 may both be exposed to the painting process of the fender 10, as set forth further below.

Figure 4A:
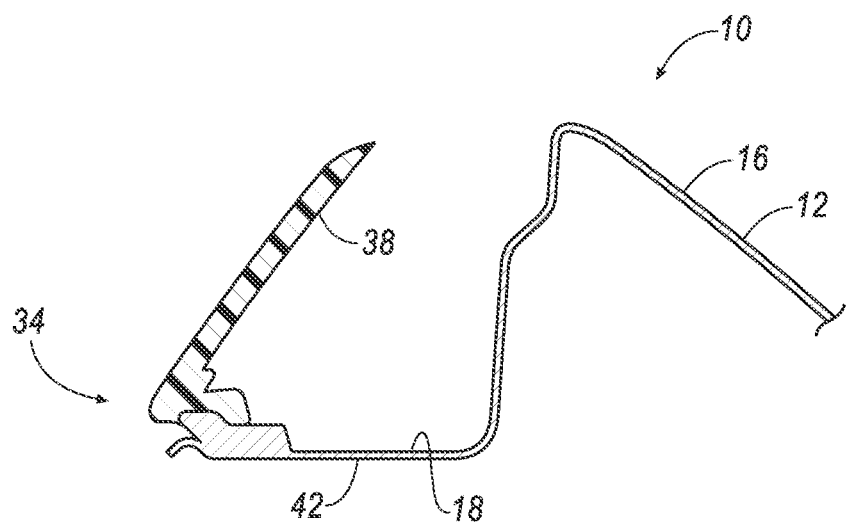
FIG. 4A is a cross-sectional view of a portion of the fender with a body portion and a seal portion integral with the body portion.
Figure 4B:
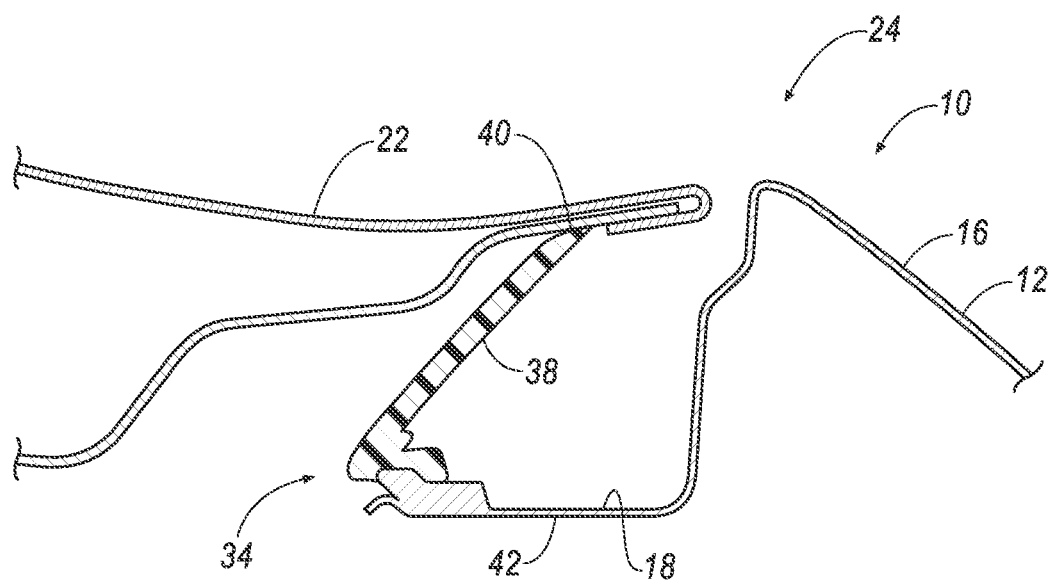
FIG. 4B is a cross-sectional view of a portion of the fender with the seal portion extending from the body portion to the hood.

The second seal portion 34 includes a base 36 integral with the body portion 12 and a lip 38 extending from the base 36 for resiliently engaging a hood 22 of the vehicle 44. The lip 38 presents a sealing surface 40. The lip 38 is resiliently flexible relative to the base 36. As shown in FIGS. 4A and 4B, the lip 38 is configured to abut the hood 22 and resiliently flex against the hood 22 when the hood 22 is in a closed position, as shown in FIG. 4B. FIG. 4A shows the lip 38 when the hood 22 is spaced from the lip 38, i.e., when the hood 22 is in an open position. The lip 38 remains biased against the hood 22 when the hood 22 is in the closed position, as shown in FIG. 4B.

The sealing surface 40 is configured to seal to the hood 22 of the vehicle 44. Specifically, the sealing surface 40 is sized and shaped to abut the hood 22 of the vehicle 44 for sealing to the hood 22 when the hood 22 is in the closed position.

The seal portion 14 resiliently seals to the hood 22. In other words, when the hood 22 is moved to an open position, the lip 38 may resiliently return to an uncompressed position, as shown in FIG. 4A. When the hood 22 is moved to the closed position, the hood 22 may resiliently move the lip 38 to a compressed position, as shown in FIG. 4B.

The fender 10 presents a ledge 42, also referred to in industry as a "catwalk," extending from the inner surface 18 and configured to extend along a hood 22 of the vehicle 44. The second seal portion 34 extends along the ledge 42 for resiliently engaging the hood 22 of the vehicle 44. The sealing surface is spaced from the ledge 42. The inner surface 18 may extend from the body portion 12 onto the ledge 42.

With reference to FIGS. 3A-4B, the seal portion 14 and the second seal portion 34 may have the same cross-sectional shape. Alternatively, the seal portion 14 and the second seal portion 34 may have different cross-sectional shapes. The seal portion 14 and the second seal portion 34 may have any suitable cross-sectional shape.

The body portion 12 may be formed of plastic. The plastic of the body portion 12 may configured to withstand painting, such as an electrostatic painting process. In other words, the body portion 12 may be subjected to high temperatures associated with automotive paint booths without unintended deformation or degradation. Specifically, the plastic of the body portion 12 may be electrically conductive for use in the electrostatic painting process. As such, the body portion 12 is molded from the plastic and subsequently painted to match the color of the rest of the exterior of the vehicle 44.

For example, the body portion 12 may be formed of a blend of polyethylene ether (PPE) and polyamide (PA). As one example, the blend of PPE and PA may be that commercially available under the tradename Noryl GTX from the Saudi Basic Industry Corporation (SABIC). The Noryl GTX is electrically conductive and configured to withstand painting, including an electrostatic painting process.

Alternatively, the body portion 12, for example, may be formed of a carbon nanotube (CNT) thermoplastic composite. For example, the body portion 12 may be formed of a PA/PPE/CNT alloy. As one example, the PA/PPE/CNT alloy may be that commercially available under the tradename CA-7000 from Samsung SDI. The CA-7000 is electrically conductive and configured to withstand painting, including an electrostatic painting process. The body portion 12 may alternatively be formed of any suitable plastic.

The seal portion 14 and/or the second seal portion 34 may be formed of rubber. As one example, the seal portion 14 and/or the second seal portion 34 may be formed of ethylene propylene diene monomer (EDPM) rubber. The rubber of the seal portion 14 and/or the second seal portion 34 may configured to withstand painting, including an electrostatic painting process. In other words, the seal portion 14 and/or the second seal portion 34 may be subjected to high temperatures associated with automotive paint booths without unintended deformation or degradation. The seal portion 14 and the second seal portion 34 may be formed of the same type of material or different types of material.

The fender 10 may be formed from an injection molding process. For example, the fender 10 may be formed from a multiple-shot injection molding process. In the multiple-shot injection molding process, multiple materials, i.e., shots, may be injected into an injection mold (not shown) to form the fender 10 from multiple materials.

As one example, a first shot of plastic may be injected into the mold to form the body portion 12. A second shot may be injected into the mold to integrally form the seal portion 14 with the body portion 12. A third shot may be injected into the mold to integrally form the second seal portion 34 with the body portion 12. The first shot, second shot, and third shot are injected into the injection mold in a molten state and, after injection and solidification, the fender 10, including the body portion 12, seal portion 14, and second seal portion 34, is removed from the injection mold as a single integral unit. The first shot, second shot, and/or third shot may be injected into the mold simultaneously or consecutively.

In the configuration where both the plastic of the body portion 12 and the rubber of the seal portion 14 and the second seal portion 34 are configured to withstand painting, the fender 10 may be formed by the multiple-shot injection molding process and subsequently subjected to painting, such as an electrostatic paint process. This advantageously streamlines the manufacturing process by allowing for the fender 10 to be painted and assembled to the rest of the vehicle 44 without the additional step of adhering seals to the body portion 12. As such, the advantages discussed above resulting from the seal portion 14 and the second seal portion 34 being integral with the body portion 12 may be achieved while also simplifying the assembly process.

The outer surface 16 is designed with a shape and size that provides desired aerodynamics and a desired aesthetic appearance. The outer surface 16 may be a class-A surface, i.e., a surface specifically manufactured to have a high quality, finished aesthetic appearance free of blemishes. The class-A surface may be painted.

The outer surface 16 faces outwardly and is visibly exposed when the fender 10 is assembled to the vehicle 44. The inner surface 18 faces inwardly and is concealed when the fender 10 is assembled to the vehicle 44.

The disclosure has been described in an illustrative manner, and it is to be understood that the terminology which has been used is intended to be in the nature of words of description rather than of limitation. Many modifications and variations of the present disclosure are possible in light of the above teachings, and the invention may be practiced otherwise than as specifically described.

What is claimed is:

1. An exterior assembly for a vehicle, the exterior assembly comprising:
   a bodyside;
   a hood;
   a fender adjacent the bodyside;
   the fender including a body portion formed of plastic, the body portion presenting an outer surface that is a class-A surface, the body portion including an inner surface facing the bodyside;
   the fender including a seal portion extending from the inner surface of the body portion, the seal portion presenting a sealing surface spaced from the inner surface of the body portion and permanently sealed to the body side;
   the fender including a ledge extending from the inner surface;
   a second seal portion spaced from the seal portion and extending from the ledge of the fender and resiliently engaging the hood;
   the seal portion and the second seal portion being integral with the body portion and being formed of rubber and being flexible relative to the body portion;
   the seal portion and the second seal portion each including a base integral with the body portion and an extension that is thinner than and flexible relative to the base;
   the fender including portions of increased thickness integral with body the at the base of the seal portion and the base of the second seal portion.

2. The exterior assembly as set forth in claim 1 wherein the second seal portion includes a lip for resiliently engaging a hood of the vehicle.

3. The exterior assembly as set forth in claim 1 wherein the sealing surface is shaped to abut the bodyside for sealing to the bodyside.

* * * * *